US008704140B2

(12) United States Patent
Kapp et al.

(10) Patent No.: US 8,704,140 B2
(45) Date of Patent: Apr. 22, 2014

(54) HEATING ELEMENT AND ITS APPLICATION

(75) Inventors: Andreas Kapp, Bensheim (DE); Helmut Zischka, Weissach (DE); Juergen Guenther, Schriesheim (DE); Benno Schmied, Ludwigshafen (DE); Michael Fuchs, Mannheim (DE)

(73) Assignee: Carl Freudenberg KG, Weinheim (DE)

( * ) Notice: Subject to any disclaimer, the term of this patent is extended or adjusted under 35 U.S.C. 154(b) by 827 days.

(21) Appl. No.: 12/724,094

(22) Filed: Mar. 15, 2010

(65) Prior Publication Data

US 2010/0270279 A1 Oct. 28, 2010

(30) Foreign Application Priority Data

Mar. 27, 2009 (DE) ........................ 10 2009 014 697

(51) Int. Cl.
*B60L 1/02* (2006.01)
*B05B 3/02* (2006.01)

(52) U.S. Cl.
USPC ........... 219/549; 219/202; 219/543; 219/546; 219/552; 252/500

(58) Field of Classification Search
USPC .......................... 252/500; 219/202, 543, 546
See application file for complete search history.

(56) References Cited

U.S. PATENT DOCUMENTS

| | | | | |
|---|---|---|---|---|
| 2004/0051082 | A1* | 3/2004 | Child et al. | 252/500 |
| 2005/0051536 | A1* | 3/2005 | Shirlin et al. | 219/543 |
| 2010/0206863 | A1* | 8/2010 | Ritter | 219/202 |
| 2010/0327452 | A1* | 12/2010 | Kobayashi | 257/773 |

FOREIGN PATENT DOCUMENTS

| | | | |
|---|---|---|---|
| DE | 102005017197 | A1 | 10/2006 |
| DE | 102005044490 | A1 | 3/2007 |
| DE | 102007042253 | A1 | 3/2009 |
| EP | 1284278 | A2 | 2/2003 |
| EP | 1 612 100 | A2 | 1/2006 |
| WO | WO 2008/122043 | A1 | 10/2008 |

* cited by examiner

*Primary Examiner* — Matthew W Such
*Assistant Examiner* — David Spalla
(74) *Attorney, Agent, or Firm* — Leydig, Voit & Mayer, Ltd.

(57) ABSTRACT

A heating element includes a support made of flexible material and a flexible grid structure with an electrically conductive paste disposed on the support.

17 Claims, 7 Drawing Sheets

HEATING ELEMENT AND ITS APPLICATION

Priority is claimed to German Patent Application No. DE 10 2009 014 697.0, filed on Mar. 27, 2009.

The invention relates to a heating element and to its use.

BACKGROUND

Heating elements are generally known and are used, for example, as seat or wall heaters.

Such heating elements are known from German application DE 10 2005 044 490 A1. The heating element comprises at least one layer comprising a matrix made up of functional fibers, whereby the matrix is electrically conductive and/or heatable, and whereby the matrix can be connected to a source of current or voltage via contact lines. The heating element can be used in the automotive sector, whereby such heating elements are employed especially for heating the seats of vehicles.

Electrically compressible and conductive pastes for the production of heating elements are likewise known, for example, from European patent application EP 1 284 278 A2. The aqueous coating composition contains a conductive powder in which a core is coated with a conductive layer. In this case, a core made of glass is preferably coated with silver. The pastes described there are used to coat flat layers, especially textiles and non-wovens, thereby imparting them with an electrically conductive finish. Such coated layers can be further processed into flexible printed conductors. However, it is a drawback here that, because of the binder, the prior-art pastes are no longer stretchable and no longer thermally deformable after they have been applied onto the layer and have hardened. A layer coated with the paste is thus likewise no longer stretchable. Consequently, the paste cannot be used where there is a need for the material to be stretchable.

SUMMARY OF THE INVENTION

An aspect of the present invention is based on refining a heating element in such a manner that it is flexible, or else flexible and stretchable, in the lengthwise direction, in the crosswise direction, and in the diagonal direction, as a result of which it can be adapted especially well to the specific circumstances of a given application case.

In an embodiment, a heating element is provided, comprising a support made of a flexible material on which a flexible grid structure made of an electrically conductive paste is arranged. The flexible grid structure made of an electrically conductive paste is of crucial importance so as to obtain a heating element that is flexible in its lengthwise direction, in its crosswise direction, and in its diagonal direction. In contrast to printed conductors made of copper, which are raised, the flexible grid structure made of the electrically conductive paste has a practically flat surface so that such a heating element can be arranged, for example, directly beneath the surface that is to be heated, even without an interlayer. Such a surface can be, for example, the leather or fabric upholstery of the seat of a vehicle, or it can be the outer fabric of functional clothing. In these cases, it is especially advantageous if the flexible grid structure is not raised above the surface of the support on which it is arranged, in such a way that it could be felt by the user.

The flexible grid structure can follow the load and can be deformed flexibly in all of the load directions of the heating element.

The paste can be flexible, or else flexible and stretchable. The paste can consist, for instance, of a dispersible thermoplastic polyurethane and of a conductive filler material, and it can contain a water-soluble thickener and water. The thermoplastic polyurethane forms the binder of the paste and is stretchable as well as thermally deformable. Thus, the paste is still stretchable, even after being processed, and can be reshaped at any time by means of thermal shaping processes, whereby the stretchability of the paste is retained. The conductive filler material is admixed in such a way that the conductive particles come into contact with each other after being processed, thus bringing about the conductivity.

The grid structure can comprise grid elements and points of intersection, whereby the grid elements are connected to each other electrically conductively and mechanically via the points of intersection. The grid elements can move relative to each other around the points of intersection, as a result of which the flexibility, or else the flexibility and the stretchability of the grid structure in the lengthwise direction, in the crosswise direction, and in the diagonal direction is considerably enhanced in comparison to a merely linear electric conductor made of an electrically conductive paste. The points of intersection are to be seen as articulated joints so to speak, whereby the grid elements themselves are also flexible, or else flexible and stretchable. Moreover, the functionality of the grid structure is retained, even in case of an interruption in a grid element.

In order to achieve the greatest possible flexibility and the best possible adaptation to the specific circumstances of a given application case, it is advantageous for the grid elements and the points of intersection to be flexible. As a result, the altogether flexible grid structure has the greatest possible flexibility.

The points of intersection can be configured to be circular. As used herein, circular means essentially circular. This entails the advantage that current and/or mechanical tension peaks can be reliably avoided, so that no hot spots or mechanical weak points occur.

If the points of intersection were formed only by intersecting electric conductors, then the conductor cross section in the area of intersection would be about 50% smaller, as a result of higher current density and greater Joule heat would occur; such a locally elevated heating power density is also called a hot spot.

If the point of intersection is configured to be fully circular, the result is a larger cross section surface area in the area of intersection, no greater current density in this area and thus no hot spot either.

If the point of intersection is drop-shaped, the cross section surface area in the area of the intersection is practically the same size as in the case of a fully circular point of intersection, but such a configuration is mechanically better since a rounded transition is obtained in the transition area from the point of intersection to the adjacent electric conductors, and consequently, mechanical tension peaks in the transition area are avoided.

The grid elements can be made up, at least in part, of polygonal elements, especially rhombic elements. Rhombic elements have not only the advantage that they bring about high flexibility and excellent stretchability of the heating element, but also, if the rhombic elements enclose free surfaces that are delimited by the rhombic element, then, if necessary, these free surfaces can be used to attain a good permeation through the heating element and/or through assembly slots through which the heating element can be mounted on a surface that is to be heated.

Due to the good flexibility/mobility of the rhombic elements, the grid structure can be given almost any desired shape, so that the heating element can have the shape of a polygonal chain or a shape in which there are alternating straight lines, arcs and curve sections without abrupt directional changes.

The width of the grid structure can be varied very well by the rhombic elements. For example, if a greater width of the grid structure is desired, additional rhombic elements can be added through additional points of intersection on existing rhombic elements. In many application cases, it is desirable for the current density or for the heating power density of the heating element to be practically constant. The term heating power density refers to the electric energy dissipated per unit of surface area. In order to achieve this objective, it is often advantageous if the width of the printed conductor and the width of the heating structure can be varied.

The rhombic elements bring about a virtually homogeneous heat distribution on the surface that is to be heated.

The grid elements and/or the points of intersection can differ in terms of thickness and/or width.

In many application cases, it is advantageous for the thickness to be 50 μm to 250 μm and/or for the width to be 2 mm to 10 mm. Due to thicker printed conductors, due to the fully circular points of intersection, and/or due to a thicker application of paste, which can be achieved, for example, by means of multiple printing, locally higher conductivity values can be reached for the heating element. Locally higher conductivity values are advantageous, for example, if less heat is to be generated in feed lines.

The grid structure can have a beginning and an end, whereby the beginning and the end are each configured as a pad to the flat contact of the grid structure. This translates into a secure and durable mechanical and electric contacting of the grid structure, and the risk of a malfunction of the heating element is kept to a minimum.

The grid structure can cover the entire surface of the support. In spite of the covering over the entire surface and the resultant largely uniform heating power density, the free areas of the grid structure can be used for assembly slots for attaching the heating element to the surface that is to be heated.

Preferably, the support consists of a non-woven. Such a non-woven support has a good permeation that is only slightly reduced by the grid structure, especially by rhombic grid elements. A good permeation is especially advantageous if the heating element is used, for example, as a seat heater in vehicles or in functional clothing. Due to temperature difference between the heating element and the surface that is to be heated or the environment, vapor can form that cannot be dissipated by the support that is covered by the grid structure.

The support can have assembly cutouts that are at least partially surrounded by grid elements. These assembly cutouts can be arranged, for example, inside the grid elements and/or at least partially surrounded by grid elements on the outer circumference.

The invention also relates to the use of a heating element as described above, as a seat heater in a vehicle. Such a use is especially advantageous since the heating element can be arranged directly beneath the surface that is to be heated, the seat upholstery. Thanks to its flat surface, no components of the heating element press through on the surface that is to be heated in such a way that irregularities are formed on the side of the seat upholstery facing away from the heating element, since the user could perceive such irregularities as uncomfortable. Moreover, the effectiveness of the heating element is especially high due to the direct arrangement on the surface that is to be heated, that is to say, the seat upholstery is heated quickly and efficiently, and the activated heating element brings about a virtually homogeneous heat distribution on the surface that is to be heated. Thanks to the flexible grid structure, even highly contoured seats can be equipped with a seat heater.

BRIEF DESCRIPTION OF THE DRAWINGS

Embodiments of a heating element according to the invention are described in greater depth below making reference to FIGS. 1 to 6.

FIGS. 1 and 1*a* a section of a heating element according to the invention that is used as a seat heater in a vehicle, in a front view (FIG. 1) and in a cross section (FIG. 1*a*), FIGS. 2 and 3 individual grid elements with points of intersection that are an integral part of the grid structure of the heating element from FIG. 1, FIGS. 4 to 6 embodiments of points of intersection.

DETAILED DESCRIPTION

Figure 1:
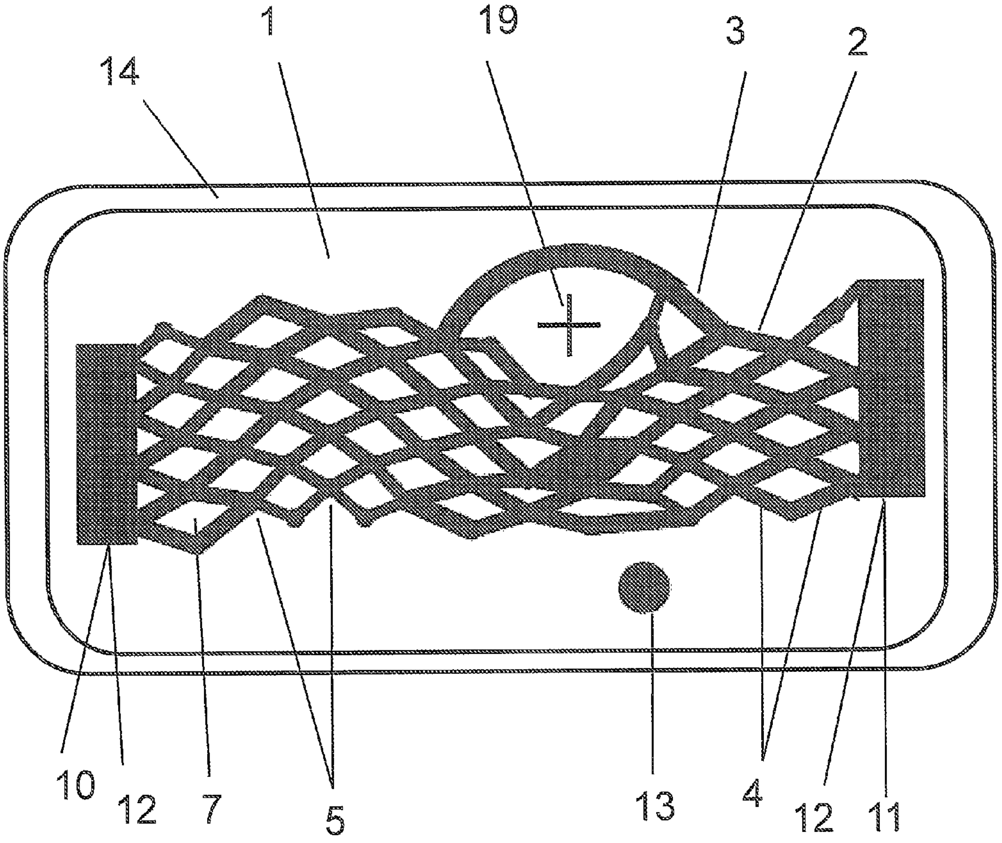
FIGS. 1 to 6 each contain a schematic depiction showing.

FIG. 1 shows a section of a heating element. In this case, the surface 14 that is to be heated is the upholstery of an automobile seat, whereby the upholstery can be seen in FIG. 1 from below, that is to say, on the side facing away from the seat surface. The grid structure 2 can follow any desired curve, resulting in a great deal of freedom for the layout, for example, of the heating geometry.

The heating element comprises a support 1 that consists of a non-woven and that is flexible, stretchable and air-permeable. The flexible and stretchable grid structure 2, which is made of an electrically conductive as well as flexible and stretchable paste 3, is arranged on the support 1. The paste 3 can be applied onto the support 1 by means of a generally known printing procedure. The flexible grid structure 2 is arranged on the side of the support 1 facing away from the upholstery 14, or else the flexible grid structure 2 is arranged on the side of the support 1 facing the upholstery 14. In order to protect the flexible grid structure 2, it can also be laminated with a protective coating, resulting in a sandwich-like structure consisting of the support 1, the grid structure 2 and the protective coating.

The paste 3 is also stretchable during the proper use of the heating element, whereby the paste 3 contains, for example, a dispersible thermoplastic polyurethane and a conductive filler as well as a water-soluble thickener and water. The thermoplastic polyurethane then forms the binder of the paste 3 and is stretchable as well as thermally deformable so that the paste 3 remains stretchable and deformable by means of thermal shaping processes, even after the processing. The conductive filler is present in the paste 3 in such a way that the conductive particles are in contact with each other after the processing, thus bringing about the conductivity.

The grid structure 2 has grid elements 4 that are connected to each other electrically conductively and mechanically via the points of intersection 5. In the embodiment shown here, the grid elements 4 and the points of intersection 5 are configured so as to make a transition to each other in one piece and they are made of a uniform material, so that, thanks to the use of a flexible paste 3, the grid elements 4 as well as the points of intersection 5 are flexible.

Due to the elastic non-woven support 1, due to slots 19 in the support 1 and due to the elastic grid structure 2, the heating element according to the invention can be deformed elastically in the lengthwise direction, in the crosswise direction, and in the diagonal direction, which is a major advantage when used as a seat heater in vehicles or in the realm of functional clothing. The heating element is thus not bulky and it does not change the properties of use of a seat or of functional clothing as compared to a seat or functional clothing without heating elements. The grid elements 4 are formed primarily by rhombic elements 7, although other polygonal elements 6, for example, triangular elements, can also be used.

The beginning 10 and end 11 each have a pad 12 in order to mechanically and electrically contact the grid structure 2 so that it can be connected to source of current or voltage.

The heating element can be affixed through assembly slots 13 in the support 1 to the surface that is to be heated, whereby the assembly slots 13 are surrounded by the grid elements 4.

Figure 1A:
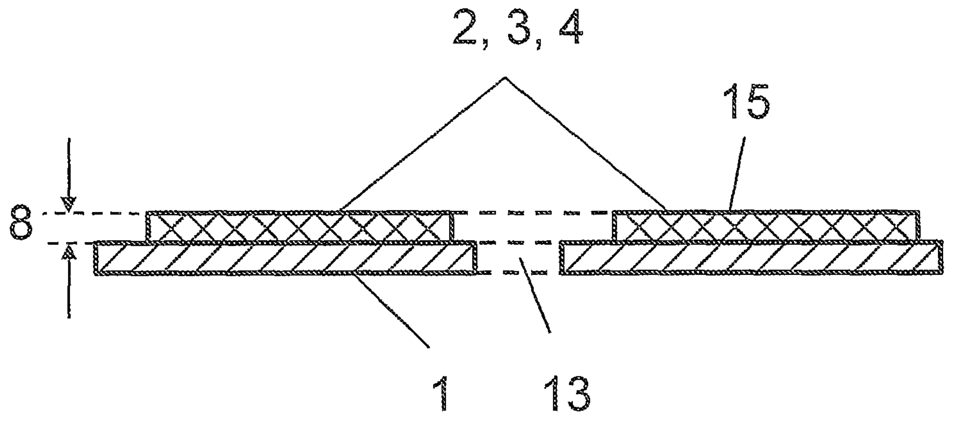

FIG. 1*a* shows a cross section of part of FIG. 1. The electric conductors 15 arranged on the support 1 form the flexible grid structure 2 that is created by an electrically conductive paste 3 and that encompasses the grid elements 4.

Figure 2:
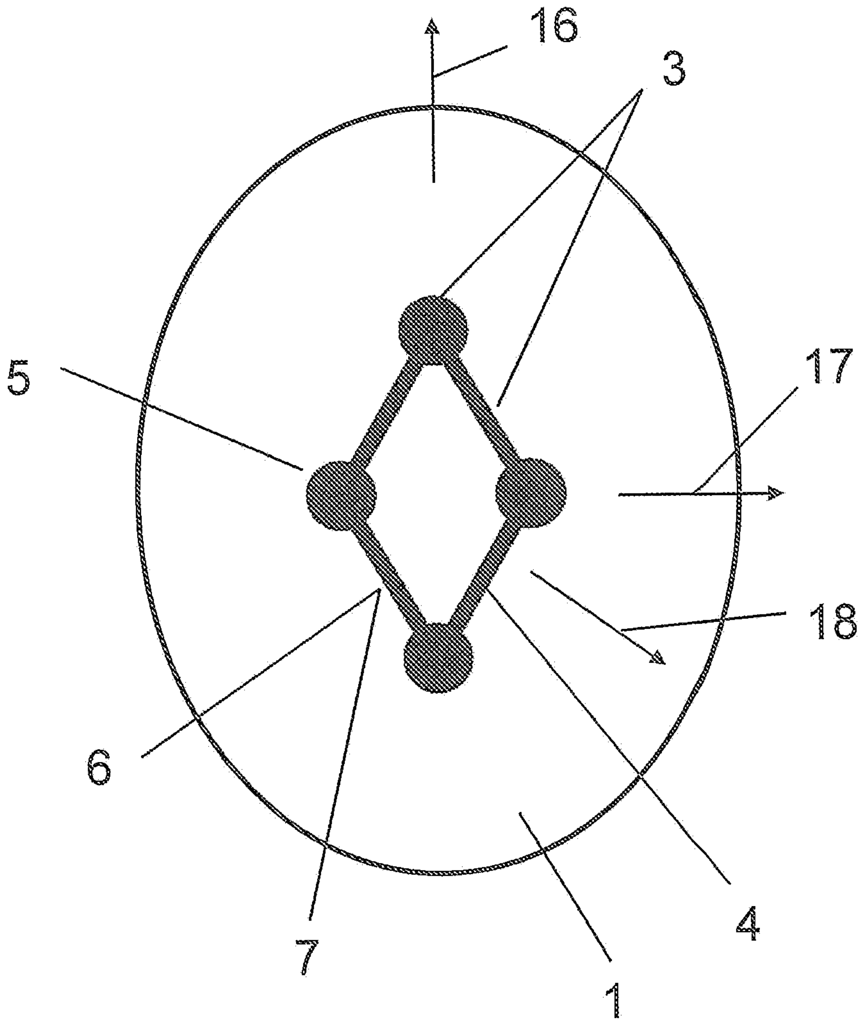
Figure 3:
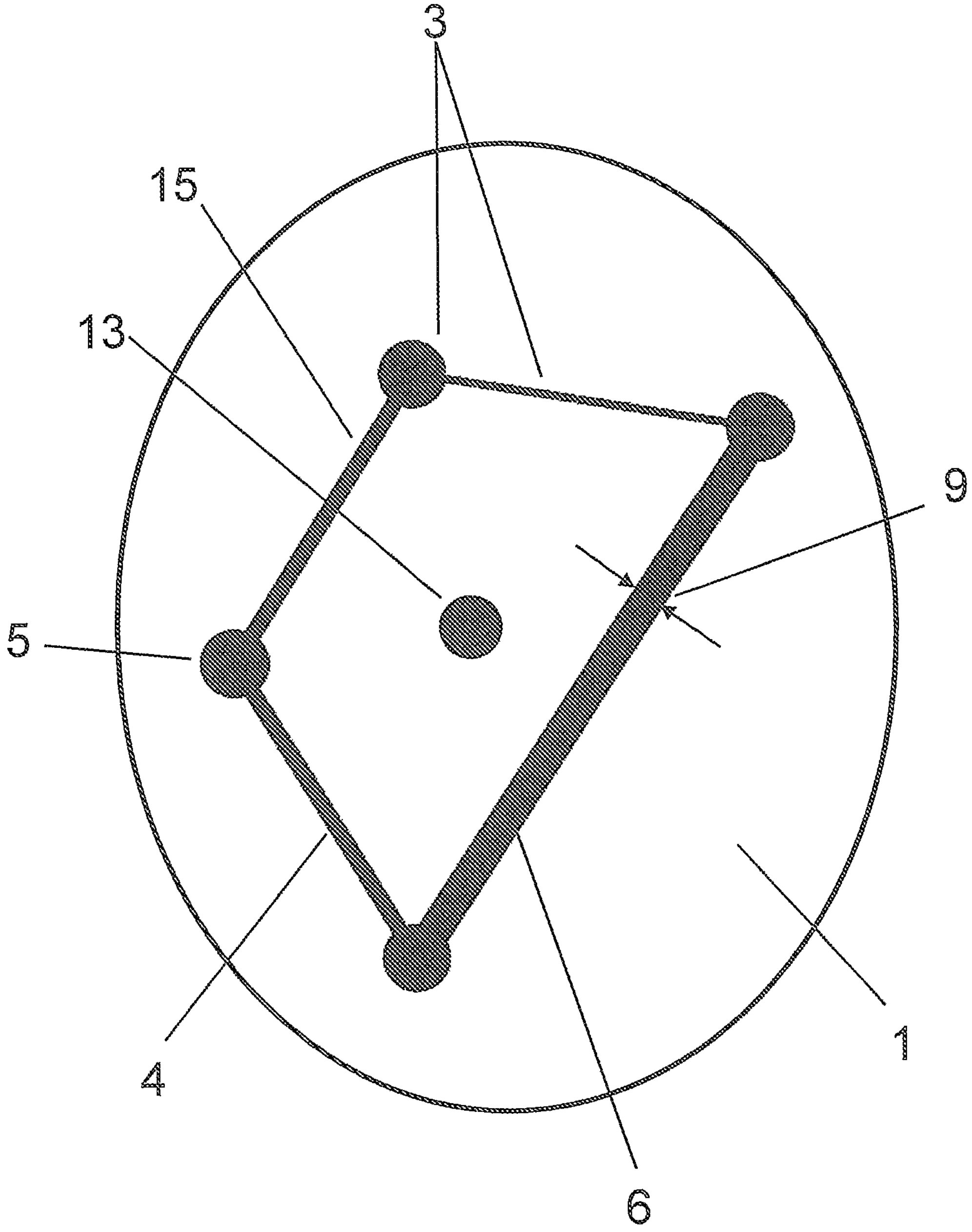

FIGS. 2 and 3 show two embodiments of grid elements 4, whereby a plurality of the grid elements 4, which can be combined with each other as desired, form the grid structure 2.

All of the grid elements 4 are configured as polygonal elements 6.

The points of intersection 5 are each configured circularly and they connect linear electric conductors 15, whereby the points of intersection 5 as well as the linear electric conductors 15 make a transition to each other in one piece and are made of a uniform material, namely, a flexible electrically conductive paste 3. As used herein, configured circularly means configured essentially circularly.

FIG. 2 shows a first embodiment of a grid element 4 that is configured as a rhombic element 7. Especially with this grid element 4, it is easy to see that it is flexible and elastically deformable in the lengthwise direction 16, in the crosswise direction 17, and in the diagonal direction 18.

FIG. 3 shows a second embodiment of a polygonal element 6 that has essentially the shape of a trapezoid. The points of intersection 5 are configured to be fully circular and constitute connection points for adjacent grid elements (not shown here). The grid element 4 shown has an assembly cutout 13 on the inside.

Figure 4:
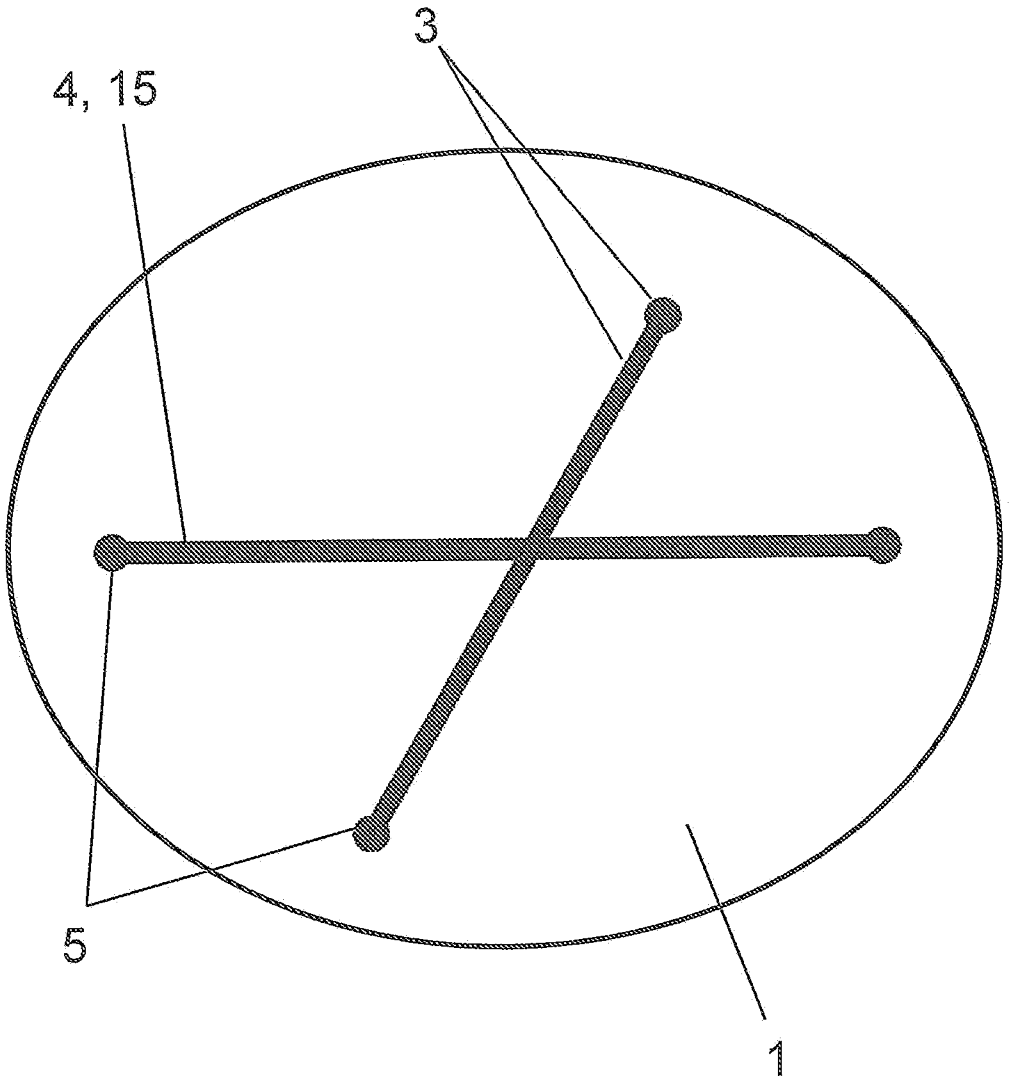
Figure 5:
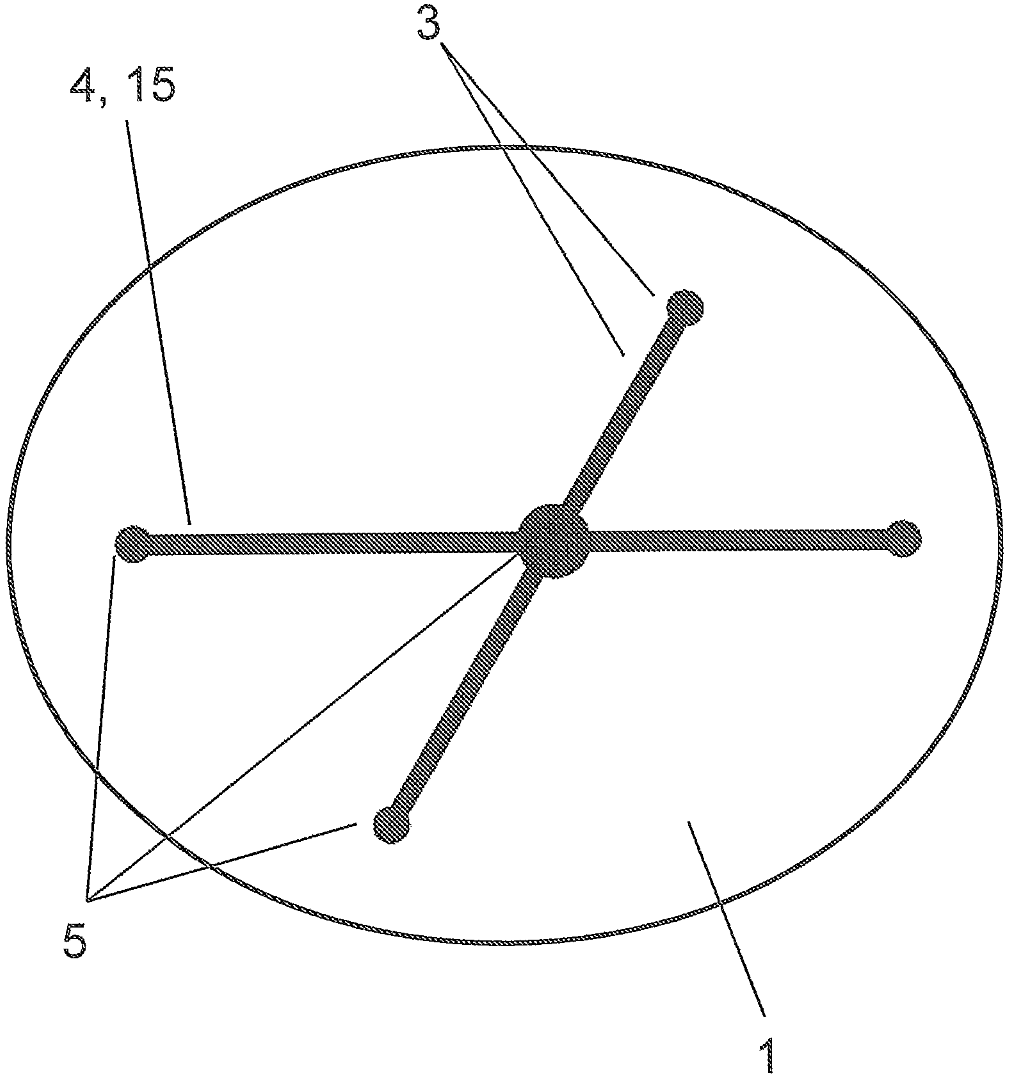
Figure 6:
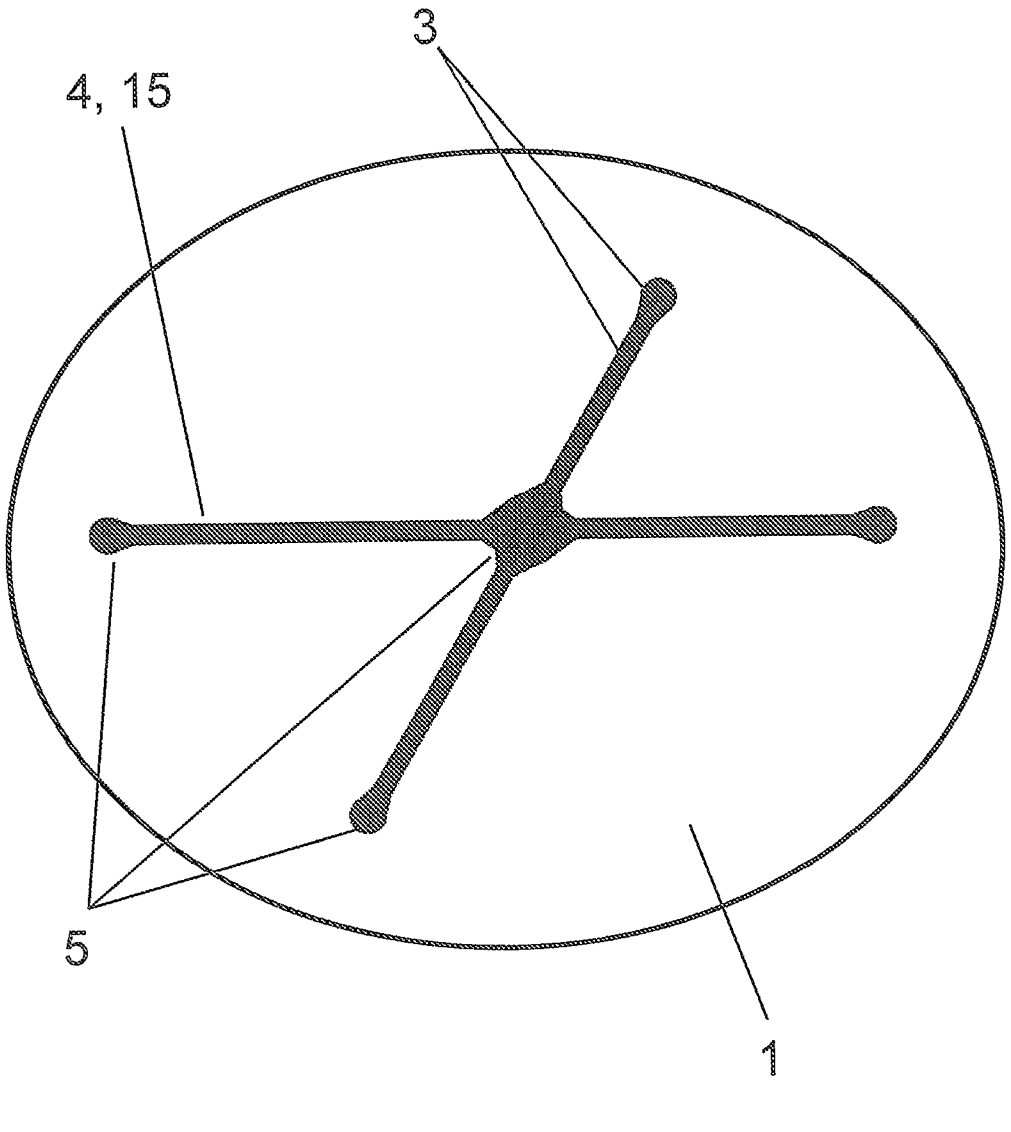

FIGS. 4 to 6 show embodiments of points of intersection 5.

In FIG. 4, the central point of intersection is formed by intersecting electric conductors 15.

In contrast, in FIG. 5, the point of intersection 5 is configured to be fully circular, as a result of which it has a larger cross section surface area than the central point of intersection from FIG. 4. This prevents hot spots.

FIG. 6 shows another embodiment of a point of intersection 5, which is drop-shaped. Such a point of intersection 5 has a cross section surface area that hardly differs from that of FIG. 5, whereby additionally, rounded transitions are provided in order to increase the mechanical strength in the transition area from the point of intersection 5 to the adjacent electric conductors 15.

LIST OF REFERENCE NUMERALS

1 support
2 flexible grid structure
3 electrically conductive paste
4 grid elements
5 points of intersection
6 polygonal elements
7 rhombic elements
8 thickness
9 width
10 beginning
11 end
12 pad
13 assembly slots
14 surface to be heated
15 electric conductors
16 lengthwise direction
17 crosswise direction
18 diagonal direction
19 slit

The invention claimed is:

1. A heating element comprising:

a support made of flexible material; and a flexible grid structure including an electrically conductive paste disposed on the support, the grid structure including a plurality of grid elements electrically conductively and mechanically connected to each other via essentially circular points of intersection.

2. The heating element as recited in claim 1, wherein the paste is at least one of flexible and stretchable.

3. The heating element as recited in claim 1, wherein the points of intersection are drop-shaped.

4. The heating element as recited in claim 1, wherein at least one of the plurality of grid elements and the points of intersection are flexible.

5. The heating element as recited in claim 1, wherein the points of intersection are fully circular.

6. The heating element as recited in claim 1, wherein the plurality of grid elements include polygonal elements.

7. The heating element as recited in claim 1, wherein the plurality of grid elements include rhombic elements.

8. The heating element as recited in claim 1, wherein at least one of the plurality of grid elements and the points of intersection differ in at least one of thickness and width.

9. The heating element as recited in claim 8, wherein a thickness of one of the grid elements is 50 μm to 250 μm.

10. The heating element as recited in claim 8, wherein a width of one of the grid elements is 2 mm to 10 mm.

11. The heating element as recited in claim 1, wherein the grid structure includes a beginning and an end, wherein the beginning and the end each include a pad so as to create a flat contact for the grid structure.

12. The heating element as recited in claim 1, wherein the grid structure covers an entire surface of the support.

13. The heating element as recited in claim 1, wherein the support includes a non-woven.

14. The heating element as recited in claim 1, wherein the support includes cutouts at least partially surrounded by the plurality of grid elements.

15. The heating element as recited in claim 1, wherein the heating element is disposed in a seat of a vehicle.

16. The heating element as recited in claim 1, wherein the grid elements are each a linear electric conductor.

17. The heating element as recited in claim 1, wherein the points of intersection are configured to have no greater current density at the point of intersection than at other locations of the grid elements.

* * * * *